(12) United States Patent
Payne

(10) Patent No.: US 6,463,724 B1
(45) Date of Patent: Oct. 15, 2002

(54) COLLECTION DEVICE FOR GRASS AND SPRIGS

(76) Inventor: Rex Payne, Rte. 1, Box 94, Thomas, OK (US) 73669

( * ) Notice: Subject to any disclaimer, the term of this patent is extended or adjusted under 35 U.S.C. 154(b) by 60 days.

(21) Appl. No.: 09/204,315

(22) Filed: Dec. 3, 1998

(51) Int. Cl.[7] .............................................. A01D 43/06
(52) U.S. Cl. .................................. 56/202; 56/DIG. 13
(58) Field of Search ...................... 56/202, 203, 206, 56/DIG. 13, 16.6, 364

(56) References Cited

U.S. PATENT DOCUMENTS

| | | | |
|---|---|---|---|
| 3,740,097 A | * 6/1973 | Parker et al. | 298/22 P |
| 3,937,502 A | * 2/1976 | Gay | 298/11 |
| 4,021,074 A | * 5/1977 | Heiser | 298/22 R |
| 4,310,998 A | 1/1982 | Cuba | |
| 4,487,007 A | * 12/1984 | Mullet et al. | 56/202 |
| 4,984,420 A | * 1/1991 | Samejima et al. | 56/203 |
| 5,249,842 A | * 10/1993 | Doering et al. | 298/6 |
| 5,291,722 A | 3/1994 | Schweigert | |
| 5,447,020 A | 9/1995 | Dunn | |
| 5,528,890 A | 6/1996 | Gray et al. | |
| 5,551,759 A | * 9/1996 | Hoss et al. | 298/22 P |
| 5,921,073 A | * 7/1999 | Cash | 56/202 |

OTHER PUBLICATIONS

Fargo Hydraulic Dump Box (brochure), Jan. 1987.*

* cited by examiner

*Primary Examiner*—Robert E. Pezzuto
*Assistant Examiner*—Nathan Mammen
(74) *Attorney, Agent, or Firm*—Patent & Trademark Services; Joseph H. McGlynn

(57) ABSTRACT

A device for collecting and dumping Bermuda grass sprigs and disposing of grass clippings and other debris having a frame, an undercarriage, side rails, and rear frame members, defining an interior space. The frame is set on wheels mounted near the rear of the undercarriage, such that the device may be towed behind self-propelled power equipment. A receptacle is pivotally mounted in the space defined by the frame members. A channel conveys airborne debris particles from the mower or other power equipment into the receptacle for collection. The upper, rear edge of the receptacle is hingedly attached to the lateral rear frame member, such that the receptacle may be rotated backwards to empty its contents. At least one extendible, hydraulic arm is fixedly mounted at one end to the frame, and pivotally connected at the other end to the side wall of the receptacle.

5 Claims, 1 Drawing Sheet

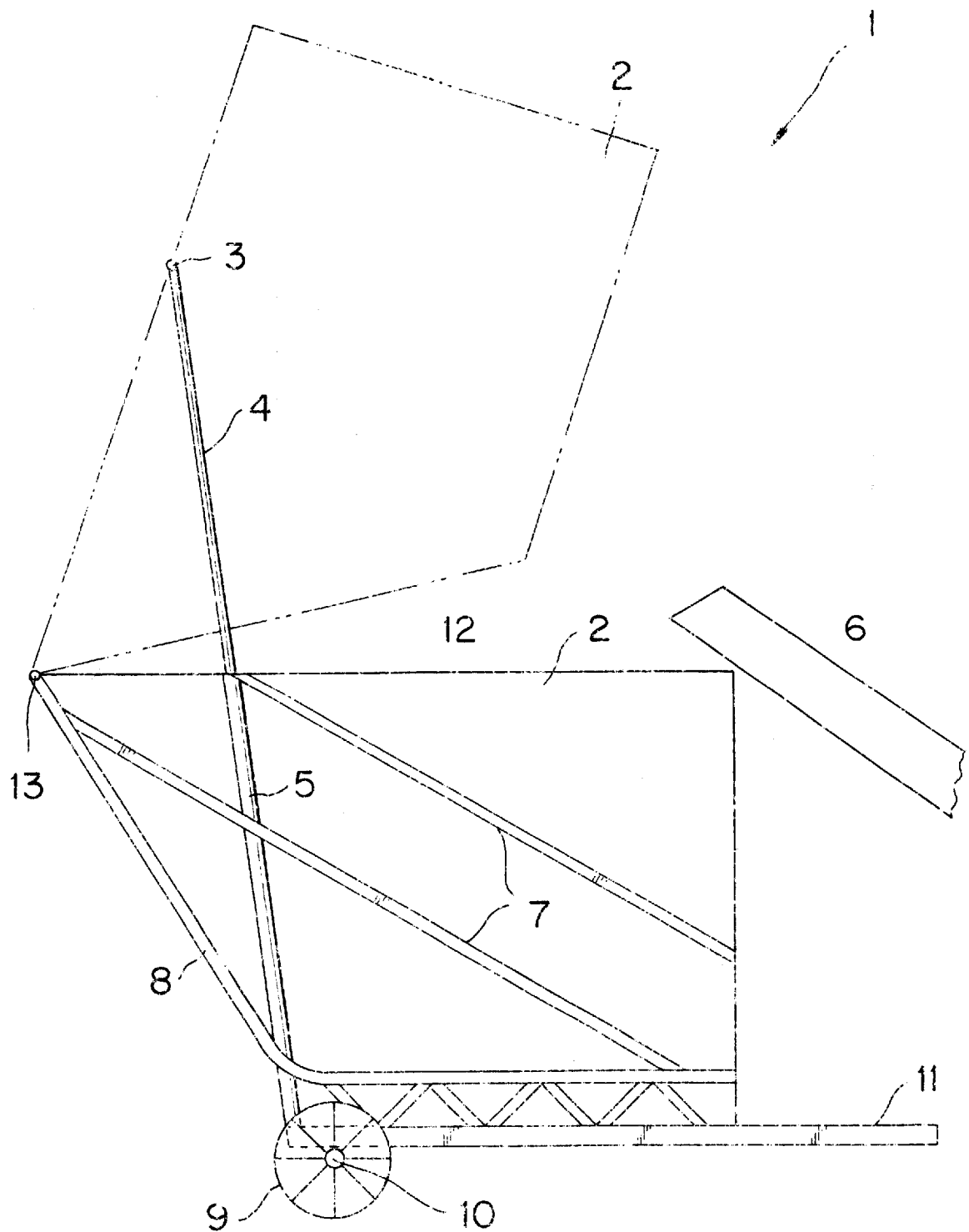
FIGURE

COLLECTION DEVICE FOR GRASS AND SPRIGS

BACKGROUND OF THE INVENTION

The present invention relates generally to devices for collecting grass and sprigs from power mowers and other harvesting equipment. In particular, the present invention relates to a collection device having an hydraulically powered, pivotally attached basket mounted on a lightweight, rolling frame for the purpose of collecting and unloading Bermuda grass, sprigs and other grass and debris, and which dumps the collected articles and eliminates the need to physically remove the sprigs, grass and debris from the device.

DESCRIPTION OF THE PRIOR ART

There have been numerous inventions disclosed in the prior art for collecting grass clippings, sprigs, and other debris from power mowers or similar equipment. These devices typically comprise a means for conveying airborne discharge from power equipment into a collection chamber. A common drawback of the known collection devices, however, is that they fail to provide a sufficiently easy and efficient means for dumping Bermuda grass and sprigs into planter equipment or for disposing of the collected debris. Accumulated Bermuda grass, sprigs, and/or clippings are potentially very heavy, and the devices so far disclosed have failed to adequately address the problem.

For example, U.S. Pat. Nos. 5,447,020 and 4,310,998 both describe grass collection devices having receptacles for receiving airborne clippings. However, these and similar devices require detachment of the collection receptacle in order to dispose of the contents. U.S. Pat. No. 5,291,722 attempts to address the difficulty associated with grass disposal by providing a collection device with a removable liner. That solution, however, still requires the user to physically lift the grass clippings. U.S. Pat. No. 5,528,890, describing a sprig harvester with a pivoting elevator, provides an improved means for directing the clippings into a receptacle, but not an improved means for the dumping of Bermuda grass or sprigs into planter equipment for disposing of the clippings.

There clearly remains a need in the art for a sprig and grass collection device that facilitates the dumping of Bermuda grass or sprigs into planter equipment for disposal of collected clippings and other debris. In addition, there remains a need for such a device that is inexpensive, safe, and adaptable for use with a wide variety of mowers and other power equipment.

SUMMARY OF THE INVENTION

The present invention provides an improved collection device for collecting and dumping Bermuda grass, grass clippings, sprigs, leaves, or other debris from power mowers and similar equipment. The invention comprises a frame, having an undercarriage, side rails, and front and rear frame members, defining an interior space. The frame is set on wheels mounted near the rear of the undercarriage, such that the device may be towed behind self-propelled power equipment. A receptacle, defined by bottom, side, front, and rear wall portions, is pivotally mounted in the space defined by the frame members. A channel conveys airborne debris particles from the mower or other power equipment into the receptacle for collection. The upper, rear edge of the receptacle is hingedly attached to the lateral rear frame member, such that the receptacle may be rotated backwards to empty its contents. At least one extendible, hydraulic arm is fixedly mounted at one end to the frame, and pivotally connected at the other end to the side wall of the receptacle. The hydraulic member may be extended to dump the receptacle, thus obviating the need for the user to physically lift either the receptacle or its contents.

Accordingly, it is an object of this invention to provide an improved collection device for the dumping of Bermuda grass or sprigs into planter equipment and for collecting and dumping grass clippings and other debris from power mowers and similar equipment.

It is a further object of this invention to provide an improved debris collection and dumping device that is inexpensive and adaptable for use with a variety of power mowers and similar equipment.

It is a further object of this invention to provide an improved debris collection device that may be towed behind power mowers and other self-propelled machinery.

It is a further object of this invention to provide a improved debris collection device that eliminates the need for the user to lift the collection receptacle or its contents to dispose of collected debris or to deposit Bermuda grass or sprigs into a Bermuda grass planter.

These and other objects and advantages will become apparent from the detailed description below, when taken in conjunction with the annexed drawing.

BRIEF DESCRIPTION OF THE DRAWING

The FIGURE shows a side view of the debris collection device of the present invention, with shadow lines depicting the collection receptacle in the raised position.

DESCRIPTION OF THE PREFERRED EMBODIMENT

Referring now to the drawing in greater detail, the collection device1 of the present invention is shown in The FIGURE, comprising generally a receptacle 2 mounted in a frame, a collection chute 6, and wheel assembly 9, 10. The collection device 1 is shown with the receptacle 2 in two operable positions, raised and lowered. The lowered position is employed for the collection of grass clippings, sprigs and other debris, and the raised position, depicted in shadow form, is employed to dispose of the contents of the collection device1.

The frame comprises bottom members 11, rear members 8, and lateral members 7, defining a space into which the receptacle 2 is pivotally mounted, as described below. Frame members are preferably constructed from hollow metal rails or some similar material, welded together to form a supporting undercarriage for the receptacle 2. In addition to providing support for the sides of the receptacle2, lateral frame members 7 additionally support the hydraulic cylinder5, as described below.

Rear frame member 8 is angled backward slightly, corresponding to the generally trapezoidal configuration of the receptacle2. This configuration provides more advantageous disposal capabilities, also described in more detail below. Bottom frame member 11 runs parallel to the bottom face of the receptacle2 and extends some distance beyond the front face of the receptacle2. It may be appreciated that the additional length of the bottom frame member11 is desirable, for the purposes of attaching the collection device 1 for towing behind a power mower, sprig digger, or other equipment. Also to that end, an axle 10 with wheels 9 is mounted on the bottom frame member 11 toward the rear end of the collection device 1.

A debris chute 6 is disposed toward the front of the receptacle 2. Debris chute 6 is of a type known in the art commonly attached to a Bermuda grass harvesting equipment, as well as a grass mower, and having a passage means for communicating airborne clippings into the receptacle 2 from a mower or other harvesting equipment.

Receptacle 2 is preferably constructed from lightweight sheet metal or some similar material, having front, rear 12, sides, and a bottom defining a container for the collection of debris. The upper, rear edge of the receptacle2 is pivotally connected by means of a hinge 13 at the top of the rear frame member 8, such that the receptacle may be backwardly rotated to effect the dumping of its contents, as depicted by the shadow lines in The FIGURE. The rear face 12 of the receptacle 2 is angled backward with respect to the front face, forming a trapezoidal configuration when viewed from the side, as in The FIGURE. It may be appreciated that the backward angling of the rear face of the receptacle 2 facilitates the dumping of the receptacle. As shown by the shadow lines in The FIGURE, the rear face of the receptacle 2 is angled toward the ground when the receptacle 2 is in the raised position, allowing debris to flow freely to the ground.

A hydraulic arm assembly of a type known in the art, comprising a cylinder 5 and an extendible piston 4, is mounted on the rear of the frame. As shown in The FIGURE, the end of the piston 4 is pivotally connected to the upper, lateral edge of the receptacle at 3. The hydraulic cylinder 5 is fixedly mounted to lateral frame members 7 and/or 8 immediately adjacent the wheel 9 at a position beneath the top of the wheel 9. Also, the hydraulic cylinder 5 is secured to the frame members within the circumference of the wheel 9, and does not extend beyond the circumference of the wheel. As may be appreciated from the shadow lines in The FIGURE, the extension of the piston 4 backwardly rotates the receptacle 2 from the collection position into the dumping position. Alternately, retraction of the piston 4 rotates the receptacle 2 into the resting or collection position inside the frame.

The unique advantages of the collection and dumping device1 of the present invention may now be appreciated. The collection device1 may be towed behind or otherwise used in conjunction with a wide variety of power mowers, chippers, and similar equipment to facilitate the collection and dumping of Bermuda sprigs into planting equipment and disposal of clippings and other debris. The collection device 1 further provides means to dump the contents of the collection receptacle2 without the need to physically lift heavy debris. In addition, the collection device1 is inexpensive, sturdy, and simple in its construction, making it useful for industrial as well as farm applications.

Although the debris collection device and the method of using the same according to the present invention has been described in the foregoing specification with considerable details, it is to be understood that modifications may be made to the present invention which do not exceed the scope of the appended claims and modified forms of this invention done by others skilled in the art to which the invention pertains will be considered infringements of this invention when those modified forms fall within the claimed scope of the invention.

What is claimed is:

1. A collection device for debris comprising:

a supporting framework, said supporting framework having at least a front, back, bottom and sides, said supporting framework having at least one wheel attached thereto, a container, said container having at least a front, back, bottom and sides, said container being hingedly connected to said supporting framework adjacent said back of said supporting framework, means for moving said container from a first position, in which said container is at least partially positioned within said supporting framework, to a second position in which said container is at least partially positioned outside said supporting framework, and said means for moving said container from said first position to said second position is attached to said supporting framework immediately adjacent said back of said supporting frame work, wherein said means for moving said container from a first position to a second position is a hydraulic arm assembly comprising a cylinder and an extendible piston, and wherein said means for moving said container from a first position to a second position has a first end attached to said container, and a second end attached to said supporting frame work immediately adjacent said at least one wheel at a position beneath a top of said at least one wheel.

2. The collection device for debris as claimed in claim 1, wherein said at least one wheel has a circumference, and said second end of said means for moving said container from a first position to a second position is attached to said supporting framework within said circumference.

3. The collection device for debris as claimed in claim 1, wherein said at least one wheel has a circumference, and said second end of said means for moving said container from a first position to a second position is attached to said supporting framework at a point which does not extend beyond said circumference.

4. The collection device for debris as claimed in claim 1, wherein when said means for moving said container from a first position to a second position is in said second position, said means for moving said container from a first position to a second position forms a substantially right angle with said supporting framework.

5. The collection device for debris as claimed in claim 1, wherein said framework has means for attaching said collection device to additional equipment.

\* \* \* \* \*